United States Patent [19]

Sprengling

[11] 4,221,750
[45] Sep. 9, 1980

[54] METHOD OF CURING PHENOLIC RESIN IN AN ELECTRICAL APPARATUS WITHOUT DEGRADING POLYETHYLENETEREPHTHALATE INSULATION ALSO IN THE ELECTRICAL APPARATUS

[75] Inventor: Gerhard R. Sprengling, Derry Township, Westmoreland County, Pa.

[73] Assignee: Westinghouse Electric Corp., Pittsburgh, Pa.

[21] Appl. No.: 43,406

[22] Filed: May 29, 1979

[51] Int. Cl.² ............................................. B29C 6/02
[52] U.S. Cl. .................................... 264/71; 264/122; 264/126; 264/263; 264/272; 264/347; 525/397; 528/129; 528/503

[58] Field of Search ................. 525/397; 264/272, 36, 264/83, 262, 263, 344, 347, 236, 69, 122, 123, 126, 265, 71

[56] References Cited

U.S. PATENT DOCUMENTS

| | | | |
|---|---|---|---|
| 2,908,603 | 10/1959 | Scott | 428/531 |
| 3,161,843 | 12/1964 | Hodges et al. | 264/272 |
| 3,795,725 | 3/1974 | Bulin | 264/272 |
| 3,825,639 | 7/1974 | Bulin | 264/272 |

Primary Examiner—James B. Lowe
Attorney, Agent, or Firm—D. P. Cillo

[57] ABSTRACT

A method of curing phenolic resin near exposed polyethyleneterephthalate subject to degradation by vaporous materials, comprises removing free phenol from the phenolic resin and heating the resin to a cured state.

10 Claims, 2 Drawing Figures

METHOD OF CURING PHENOLIC RESIN IN AN ELECTRICAL APPARATUS WITHOUT DEGRADING POLYETHYLENETEREPHTHALATE INSULATION ALSO IN THE ELECTRICAL APPARATUS

BACKGROUND OF THE INVENTION

Encapsulating transformers with phenolic resin coated filler is well known, and taught by Hodges et al. in U.S. Pat. No. 3,161,843. In some advanced transformers, polyethyleneterephthalate (PET) film, is used for insulating purposes, such as for turn and phase insulation between electrical conductors, and is either in contact with the phenolic resin coated filler encapsulant or in the same transformer enclosure.

Experience with such PET-phenolic resin coated filler systems has disclosed, in some instances, brittleness of the PET insulating films, even where the PET film was not contiguous to the phenolic resin present. What is needed is a method to utilize such PET-phenolic systems without degradation of the polyethyleneterephthalate.

SUMMARY OF THE INVENTION

The above need is met by removing free phenol from the phenolic resin which is near the polyethyleneterephthalate, preferably by using a phenolic resin containing only trace amounts of free phenol, preferably less than about 0.35 wt% of the phenolic resin, and optionally, purging the volume of the electrical apparatus with an effective amount of air, at appropriate times during cure of the phenolic resin.

More specifically, the preferred method of this invention, when used for transformer applications, comprises: (1) positioning the transformer in an open case, the transformer containing polyethyleneterephthalate insulation with an exposed surface area, having a known weight subject to vapor absorption and degradation by free phenol vapor, and the case also containing an uncured phenolic resin having a known weight of free phenol subject to being vaporized and absorbed by the exposed polyethyleneterephthalate at temperatures of over about 120° C., where the total weight of free phenol in the phenolic resin is at most 0.20% of the weight of exposed polyethyleneterephthalate, (2) heating the open case and apparatus at between about 145° C. and about 180° C., for up to about 8 hours, to cure the phenolic resin without degrading the polyethyleneterephthalate and optionally (3) passing air through the open case and apparatus, in an amount and at times effective to remove vapors caused by heating the phenolic resin, before vapor absorption by the polyethyleneterephthalate.

BRIEF DESCRIPTION OF THE DRAWINGS

For a better understanding of the invention, reference may be made of the preferred embodiment, exemplary of the invention, shown in the accompanying drawings, in which.

DESCRIPTION OF THE PREFERRED EMBODIMENTS

Electrical apparatus, including electrical conductors, transformer coils, and electronic components, such as electrical switches, motor controller assemblies and the like, where electrical conductors must be insulated, and where phenolic resin degradable film insulation is used, can be potted or cast with a phenolic resin composition, using the method hereinbelow described, without degrading the film insulation. Preferably, these phenolic resin compositions will contain only trace amounts, i.e., up to about 0.35 wt.%, of free phenol.

Figure 1:
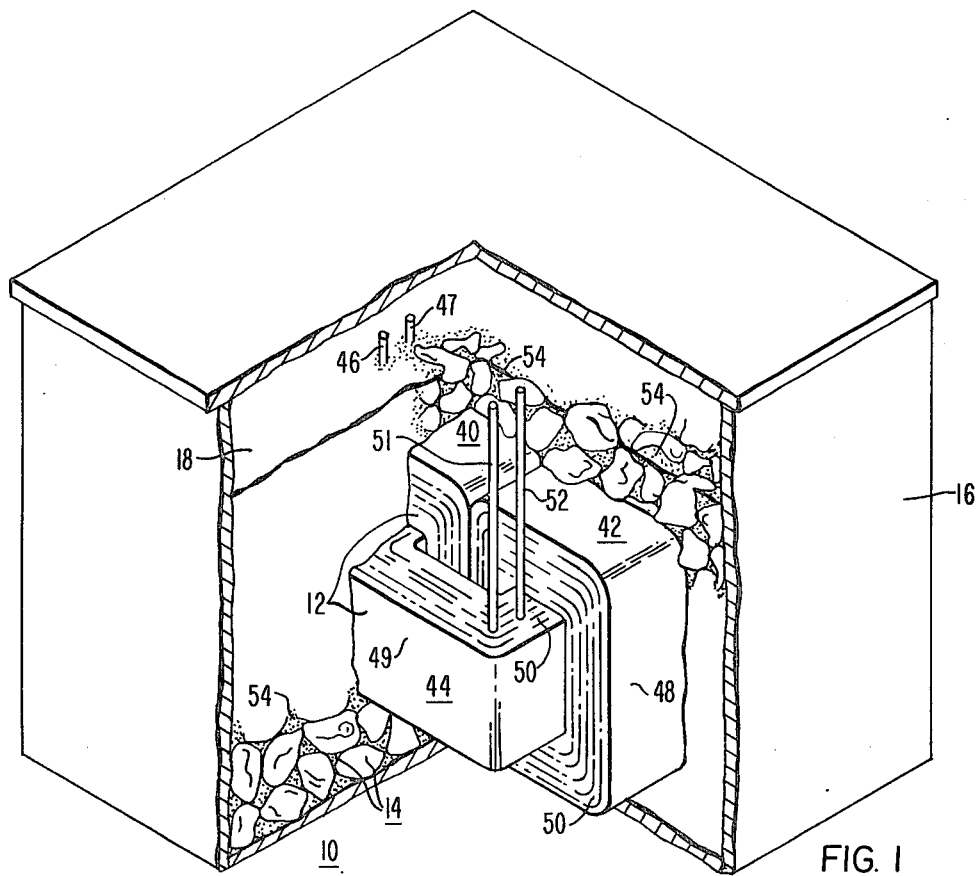
FIG. 1 is a perspective view, partially in section, of transformer containing polyethyleneterephthalate turn insulation, and utilizing a phenolic filler composition.

Referring to FIG. 1 of the drawings, there is shown an electrical apparatus 10, such as a transformer. The transformer 10 includes a magnetic core and coil assembly 12, wherein magnetic cores 40 and 42 have a phase winding 44, which represents both the primary and secondary windings of the transformer 10, disposed in inductive relation thereon. The magnetic cores 40 and 42 generally comprise steel laminations 48, and the phase winding 44, generally comprises wound aluminum foils 49. The laminations and foils are insulated from each other by one or several layers of polyethyleneterephthalate (PET) layer insulation 50, shown in detail in FIG. 2 of the drawings. This PET layer insulation is exposed at its edges, and possibly some distance into the core or winding depending on the tightness of winding, especially at electrical lead connections.

The magnetic core and coil assembly 12 is disposed in an air permeable enclosure case 16, the bottom of which is only spot welded, leaving gaps for air to flow out. An encapsulating compound 14, comprising phenolic resin coated filler, can surround the magnetic core and coil assembly 12 and substantially fill the case 16 to a level 18 above the top of the magnetic core and coil assembly 12, to conduct heat therefrom to the case 16 where it is carried to the ambient atmosphere. Electric leads 46, 47, 51 and 52 extend from the coil assembly through the encapsulating compound 14 to connect the transformer 10 to an external electrical circuit.

Since PET is a good and a relatively inexpensive layer insulation and since phenolic resins are one of the most cost effective resins obtainable for a variety of uses in transformers, such as a filler binder, a PET-phenolic insulation system is highly desirable. However, PET, in many cases degrades and becomes brittle if present in the area where phenolic novolac resin is being heat cured. It is the phenolic resin composition, coating and binding the filler particles of the encapsulating compound 14, that can cause degradation of exposed PET at the foil and lamination edges, and elsewhere in the transformer where it is subject to vapor contact.

In making the transformer, the magnetic core and coil assembly 12 is initially positioned in the enclosure case 16. Inert, inorganic, particulate filler material is then poured into the case 16 to surround the magnetic core and coil assembly 12 and to fill the case 16 to a level 18. Two different types of particulate filler material of substantially different average particle sizes, may be utilized. The first filler material can consist of uncoated gravel particles having a generally spherical, oval or otherwise rounded surface which enables the filler to compact into a dense mass. The rounded surfaces form a plurality of voids or gaps between contiguous uncoated gravel particles which allow a second, coated particulate material to flow easily therebetween and attain an even dispersion throughout the encapsulating compound 14. Preferably, natural deposited, river bed silica gravel is utilized in sizes varying from about ⅛ inch to about ¾ inch in diameter as the large filler.

The second, smaller, particulate filler material is poured on top of the gravel. This second filler material consists of finely-divided, inert, inorganic particles, such as silica, alumina or hydrated silicates coated with a resin. Examples of such materials, which may be used singly or in any combination of two or more, includes sand, porcelain, slate, chalk, aluminum silicate, mica powder, glass and aluminum oxide. Sand is used as the preferred second, smaller filler material and, more specifically, round sand is utilized due to its easy availability in the desired range of particle sizes and excellent thermal conductivity properties.

A curable binder material is added to the smaller filler particles to cohesively bind the sand and the gravel together into an infusible mass. Although the binder material may be added in many ways, it is preferably added as a thin,, dry coating on each of the smaller particles. After the filler is in place, additional phenolic resin can be added to the filler in the form of a resin solution, the resin portion of which will deposit after solvent evaporation during heating.

A phenolic novolac type of resin is utilized as the binder for the filler particles, since it is inexpensive and is available in a readily usable form. The phenolic resin coated sand particles are of approximately 60 to 90 mesh diameter. The sand particles are uniformly covered with about 2.5 to 5 weight percent of a thin, dry coat of phenolic novolac resin, usually by a molten resin application technique.

The amount of phenolic novolac resin used can be adjusted to give a considerable range in strength and porosity of the resultant filler composition. Use of between about 1 weight percent to about 3 weight percent resin, based on the total weight of the large and small filler, will provide the best compromise of low cost and high strength in the cured filler composition. Below 1 weight percent resin and the filler composition many be too weak to remain crack free during operation of the encapsulated electrical apparatus. Over 3 weight percent resin and, in addition to increased cost, it will be more difficult for the vaporous reaction products of curing to escape from the interior void volume of the sand composition.

Phenolic resins are well known in the art, and are thoroughly discussed in Megson, *Phenolic Resin Chemistry*, Academic Press, 1958 particularly chapter 3. They are conventionally obtained by reacting a phenolic substance such as phenol itself or or substituted phenols such as cresols, xylenols, or butyl phenol with an aldehyde such as formaldehyde, propionaldehyde, acetaldehyde, benzaldehyde or furfural. The characteristics of the materials formed by the reaction of phenols with aldehydes can be varied widely by choice and ratio of reactants and by such reaction conditions as acidity, alkalinity, temperature, time, catalysts or accelerators and presence and nature of solvent or diluent.

Two-step phenolic resins (novolaks) are obtained with acidic catalysts and less than one mol of formaldehyde per mol of phenol. In the acid catalyzed reaction, although methyols are formed as intermediates, they are immediately, under the influence of the acid, converted to methylene links. These resins are characterized by requiring effective amounts of additional formaldehyde or some cross-linking agent such as hexamethylenetetramine to cure. These phenolic novolacs normally contain major amounts, i.e., about 5 weight percent to about 10 weight percent, of free, unreacted phenol.

During or after the resin coated sand particles have been added to the gravel, the entire open case 16 is subjected to slight vibrations which disperses and compacts the resin-coated sand particles evenly throughout the larger gravel particles within the case 16.

At this point in the process, interstices or voids, shown as 54 in FIG. 1, will exist between contiguous sand and gravel particles within the case 16. These voids 54 will constitute approximately 10 percent to 20 percent of the total volume of the encapsulating compound 14 within the case 16.

Although this invention has been illustrated primarily as a transformer application utilizing a combination of two types of particulate filler materials, it will be understood that it applies equally as well to compositions containing only one type of particulate filler material. This invention also applies to cases where phenolic novolac is present not as a filler binder, but in any type of coating which is near PET and which must be cured, and whose vapor products will contact PET films.

The entire transformer minus the top covering is then heated, generally at an oven temperature of between about 155° C. and about 175° C., for between about 4 to about 6 hours to finally cure the phenolic novolac resin coated composition. The curing process transforms the resin coated filler into a strong, rigid composition. During curing, a great deal of the vapors and reaction products escape from the interior void volume of the sand composition via pores and passageways between the sand particles to the ambient air. During curing, a great deal of the vapors also contact a substantial portion of the exposed PET used at various placed in the transformer. On curing, the thin phenolic resin film bonds each filler particle to the adjacent particles.

When the transformer is put into operation, its PET insulation and component parts are subject to internal mechanical stresses. It is necessary that the insulation and filler composition be able to withstand such stresses without cracking.

Figure 2:
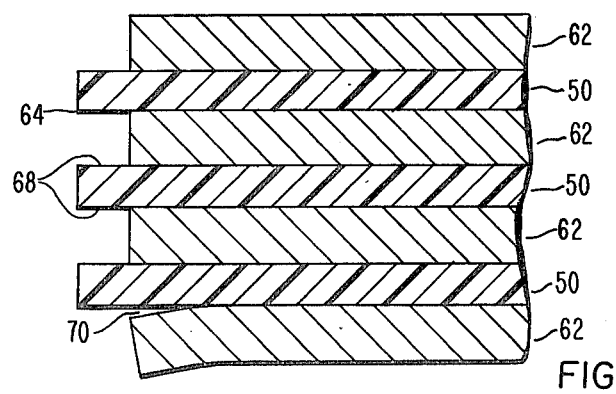
FIG. 2 shows a magnified cross-sectional view of foil conductors insulated with polyethyleneterephthalate.

FIG. 2 of the drawing more clearly shows the edge exposure of the polyethyleneterephthalate (PET) insulating film 50, which is generally about 0.0005 to 0.002 inch thick for turn insulation, and about 0.005 to 0.020 inch thick for phase insulation. The PET film is used between conducting layers 62 of the magnet cores or phase windings. Exposure of the flat, extended edge 64 of the PET film allows vapor contact with free phenol and other vaporous materials during heat curing of any phenolic resin nearby. The area exposure is shown as 68.

Cracking of the protruding edge 64 is enough to cause electrical failure. The PET film protrudes about ⅛ to ¼ inch from the edges of the conducting layers 62, in order to furnish electrical "creepage distance" and to allow for inaccuracies in winding. If the conducting layers are loosely wound, vapors can permeate into the void, shown as point 70, to degrade the PET deep within the conducting layers. Of course, in addition to these areas of exposure, PET may be used in other large exposed quantities elsewhere in the apparatus and be subject to attack.

Associated with the use of phenolic resin in the electrical apparatus, is the presence of a curing agent, such as hexamethylenetetramine, an alcohol, such as isopropanol, and some quantities of water. During cure, ammonia, which is a catalyst for cure, is evolved, most of which evaporates. After phenolic resin cure in the presence of exposed PET film, it was found that the most severe embrittlement of the PET film often occurred in areas not contiguous to the phenolic resin present, indicating that the embrittling agent had to be transported to the film via the vapor phase.

It has been found that the primary cause of polyethyleneterephthalate (PET) embrittlement at oven curing temperatures of about 175° C. for 4 to 6 hours is free phenol contained in the phenolic novolac resin. Normally, such resins contain about 5 weight percent to 10 weight percent of free phenol. Such amounts were heretofore never thought to present any problem to PET. However, the PET film was found to be embrittled by absorption of over about 0.25% of its weight of phenol.

A large percent of the phenol present escapes reaction with the curing agent added, i.e., hexamethylene tetramine, and is volatilized during cure. The length and tortuosity of the fine, capillary pores in the coated filler composite prevents escape of all of the phenol vapors to the atmosphere, even with the transformer top off during cure in an air circulating oven. The same would be true of other semi-enclosed situations. Instead, the free phenol is in large part absorbed by the PET exposed. Such absorption and consequent embrittlement can take place in one to a few hours at 150° C. to 170° C., depending on the degree of confinement. Even tripling the amount of curing agent was not found effective to tie up free phenol and present embrittlement. Coating PET with common varnishes was likewise found to be ineffective.

Embrittlement as severe as observed here, sometimes even causing spontaneous cracking of 0.010 inch thick PET by such very small amounts of active agents is surprising, since phenol does not readily react with PET. PET is a polyester of mean molecular weight of around 20,000, and its ester linkages can be split by either hydrolysis or alcoholysis reactions. However, phenols would react with great difficulty. Moreover, it can be calculated that the small amount of phenols responsible for embrittlement could at most split only one in every 5 to 6 molecules of the polymer. This is not enough to cause anything like the embrittlement observed.

Amorphous PET has a density of 1.331; fully crystalline PET has a density of 1.455. The biaxially stretched and heat relaxed commercial films available usually have a stated density of about 1.39, corresponding to about 50% crystallinity. The exact distribution and type of crystallinity can have an enormous effect on toughness or brittleness. Both amorphous and fully crystallized PET are brittle. Crystallization, or also rearrangement of molecules from one ordered array into another, depends on molecule and segment mobility. This in turn is a function of the glass transition temperature, Tg. Phenol was found to be a solvent for PET. Absorption of phenol into PET was found to increase mobility (effectively lower Tg) and thus promote rapid crystallization. Very small amounts of phenol solvent can suffice, for as crystals form, the solvent is effectively "squeezed out of" its structure, being thus concentrated in the remaining amorphous structure.

PET that has been heated for some time at 150° C. to 170° C. is largely fully crystallized. It may be brittle, but not in comparison to what is observed here. There appears to be another phenomenon involved. Since crystallization involves an increase in density, there is a volume decrease implied. In heat crystallization this shrinkage is simply taken up by a dimensional change of the entire sample.

However, when one small unit of volume of the PET crystallizes and shrinks while adjacent volumes are yet unchanged, then the polymer breaks up internally with formation of crazes and voids around the forming crystallite. It is believed that the phenomenon is enabled by the fact that a solvent, such as phenol here, thus absorbed into a PET film through its faces, advances toward the center in shape of a sharp concentration front instead of a gradient. The high crazing stresses then occur at the advancing front.

Certain other phenols present in phenol novolac resins will also embrittle PET in likewise and similar amounts. These phenols are the three isomeric dyhydroxy diphenyl methanes (4,4'-; 2,4'-; and 2,2'- ditans) and xanthene. These materials cannot be effectively removed from the phenolic novolac resin. However, due to their greater molecular weight and consequent low volatility, these ditans require heating the composite much longer, i.e., 10 to 20 hours at 170° C., to embrittle PET. Such situations would not normally occur in curing any resins contained in a transformer.

Finally, alcohols and, to some degree, water present may embrittle PET, though only under extraordinary circumstances of confinement. They may also act as adjuvants, aggravating the embrittlement of PET by phenols. It has also been found that elimination of certain blocking agents, such as calcium stearate, on the sand particles helps free trapped vapors. When contacted by liquid phenolic resin solution, as in the case where additional resin is added in solution after the filler is in place, some calcium stearate enters the liquid and forms a difficultly filterable semi-gel, blocking the substrate pores and preventing further liquid penetration into them. Such blocking of pores also impedes escape of embrittling agents into the ambient atmosphere.

According to one embodiment of the invention, the solution of PET embrittlement involves removing substantially all of the free phenol from the phenolic novolac resins used. By "removing" is meant: elimination of sufficient free phenol to provide a content of less than 0.20% of the weight of exposed PET, generally elimination of all but about 0.35 percent of free phenol in the novolac. This is accomplished by any suitable means, such as treatment of the resins prior to their use, using a commercial source having only trace amounts of free phenol, or air purging phenolic novolac during cure prior to diffusion of harmful vapors into the PET.

Resin treatment can be accomplished by differential solubility of the resin in water, i.e., washing, or by vacuum distillation. Suitable resins are now commercially available, containing from about 0.2% to 0.35% free phenol. Use of such resins has been found to completely prevent PET embrittlement during normal cure of nonclosed transformers at up to 6 hours at oven temperatures of about 170° C. Helpful also is the elimination from the resin coating on the sand of the calcium stearate normally used as an anti-blocking agent.

All of the embrittling agents may also be removed from the porous composite by passing air near the novolac, as by purging the pore volume of the transformer, or other electrical apparatus, with air at appropriate times during cure of the phenolic resin. Appropriate times are such that the harmful agent in question has volatilized but not yet had time to diffuse into the PET.

Thus, during cure of a transformer unit, such times might be at ⅛ and again at 4/5 of the total cure time.

An example of how such an air purge of a phenolic resin coated filler encapsulated transformer may be accomplished follows: The normal air circulation of the curing oven can be concentrated at the open surface of the composite fill therein, at a velocity sufficient to produce a stagnation pressure at this face of about 0.1 in. to 0.2 in. H₂O. Since the bottom seams of the enclosure case are only spot welded, thus not airtight, this will suffice to purge the void volume of the composite in the case with air within about two minutes.

Such purging, of from about 1 to about 3 times the chamber volume, with air, preferably over a time period of between about 15 seconds to about 7 minutes, has been found effective in removing all embrittling agents named above. This has the same effect as elimination of free phenol to provide a content of less than 0.20% of the weight of exposed PET. Thus purged units do not thereafter show PET embrittlement, even on prolonged further heating. This air purging is effective alone to solve PET embrittlement, even using phenolic novolacs containing major amounts of free phenol. With purging the weight of free phenol in the phenolic resin can range up to about 10 percent of the weight of phenolic novolac.

One generally useful method to provide effective control of PET degradation in transformers such as shown in FIG. 1, is to calculate the exposed area of PET in each electrical apparatus environment, for example the summation of areas 68 shown in FIG. 2, plus areas of PET exposure elsewhere in the apparatus. Knowing the thickness of the PET films used and the density of PET, generally 1.39, the weight in grams of exposed PET can be found (area×thickness×1.39). Only that amount of phenol novolac can be used in the system which upon cure will release free phenol below 0.20 wt.% of the weight of exposed PET.

Under ordinary circumstances, use of a phenolic resin having a free phenol content of up to about 0.35 wt.% can be used in the method of this invention. This amount of free phenol would constitute an amount effective to prevent embrittlement of PET during phenolic resin cure at 150° C. to 170° C., for between 4 to 6 hours, in open lid heating of a transformer.

EXAMPLE 1

Polyethyleneterephthalate (PET) embrittlement experiments were carried out in heavy-wall, glass Underwriters' Labs testing tubes of 2.5 cm. dia., 30 cm. length (internal dimensions) and about 150 ml. volume. These were closed with Teflon pressure seal caps supplied with a ¼ in. dia. tubing outlet containing a needle valve, which was always left open. These tubes provided an approximately equivalent degree of vapor containment as in a transformer during heating.

Pieces of flexible, 0.010 in. thick polyethyleneterephthalate film 3 in.×4¼ in. (sold commercially as MYLAR film by DuPont de Nemours & Co.) weighing about 3 grams were sprung into the bore of the tube near its mouth to form a lining. Phenolic novolac resin coated sand used was contained in an aluminum foil boat, placed near the tube mouth and resting on the PET. The boat contained about 20 grams of sand, containing about 0.75 to 1 gram of solid phenolic novolac resin, plus hexamethylene tetramine catalyst, dissolved in 4.5 ml. of isopropanol to distribute it over the sand. This environment simulated an open top transformer environment, containing exposed PET and uncured phenolic resin in a sand encapsulant composition.

For Sample (A), 20 grams of 60 to 90 mesh sand was coated only with phenolic novolac resin, to provide coated sand containing about 4 wt.% resin, or about 0.8 gram of solid resin. The phenolic novolac resin contained about 13 wt.% of hexamethylene tetramine catalyst, based on resin weight. The phenolic novolac resin used contained only about 0.30 wt.% of free phenol, i.e., trace amounts (sold commercially as Phenolic No. 24-706 by Reichhold Chemical Co.). The weight of free phenol:weight of exposed PET was about 0.0024:3 grams. Thus, the maximum amount of free phenol that could be absorbed by the PET would be about 0.08% of the weight of the PET.

The tube was placed in a hot air furnace in order to cure the phenolic novolac resin in the aluminum boat, and allow free phenol vapors to contact and be absorbed by the entire exposed area of the PET. After 3 hours the tube was cooled and opened. The phenolic novolac-sand composition was cured to a solid mass and the PET strip remained flexible and was not embrittled. The PET remained completely flexible even after continued heating at 175° C., for another 2 hours, and remained relatively flexible for an additional 11 hours heating at 175° C., illustrating the beneficial effect of free phenol removal upon PET film.

For Sample (B), the phenolic novolac resin used contained about 7 wt.% of free phenol, i.e., a major amount (sold commercially as Durez No. 28539 by Hooker Chemical Co.). The weight of free phenol:weight of exposed PET was about 0.056:3 grams. Thus, the maximum amount of free phenol that could be absorbed by the PET would be about 1.9% of the weight of the PET. Using the same apparatus and experimental procedure as described above, the tube was heated at 175° C. in a hot air furnace. The 7 wt.% free phenol resin caused brittleness in the PET after 1 hour exposure.

Similar results to Samples (A) and (B) were experienced using other brands of commercially available 0.010 inch thick polyethyleneterephthalate film., i.e. MELINEX (sold commercially by ICI-America Corp.). Using completely enclosed glass tubes, pure phenol and a PET sample, where all of the phenol was vaporized to contact the PET, the PET sample was embrittled after heating for several hours at 170° C., after absorbing 0.25% of its weight of free phenol.

EXAMPLE 2

In this instance an air purge apparatus was constructed. This consisted of an open-end glass tube of 2.2 cm. dia. and 10 cm. length (internal dimensions). The tube was closed at both ends by clamp-on aluminum caps carrying ⅛ in. dia. tube connection and gasketed to the glass tube by silicone rubber. For cure, the apparatus was placed in an air oven and Teflon tubes were connected to the tube connections, each of the tubes extending outside the hot air oven. The bore and length of the Teflon tubes was such that very little spontaneous air or vapor movement occurred into or out of the glass tube. This environment again simulated an open transformer environment containing exposed PET and uncured phenolic resin on a sand encapsulant composition.

The whole tube was filled with 55 grams of 60 to 90 mesh sand coated only with phenolic novolac resin, to provide coated sand containing 4 wt.% resin, or about 2.2 grams of resin. A piece of flexible 0.010 in thick polyethyleneterephthalate film 0.4 in.×2 in. (sold commercially as MYLAR film by DuPont de Nemours & Co.) weighing about 0.18 gram was also placed in the tube.

The phenolic novolac resin used contained about 0.30 wt.% of free phenol (sold commercially as Phenolic No. 24-706 by Reichhold Chemical Co.), the weight of free phenol:weight of exposed MYLAR was, however, about 0.0066:0.18 grams in this environment. Thus, the maximum amount of free phenol that could be absorbed by PET would be about 3.7% of the weight of the PET. After heating for 1 hour the PET was still flexible, but became relatively unflexible thereafter, and after 16 hours at 175° C. the PET became brittle.

The apparatus containing flexible PET film and the phenolic novolac resin with 0.30 wt.% free phenol, Reichhold No. 24-706, as described above, was subjected to an air purge with a volume of air equal to about 1.5 times the void volume of the sample. The air was swept through the sample by means of a syringe attached to one of the Teflon tubes outside the oven. The air sweep was at 45 minutes and 90 minutes after the start of cure. Continuing exposure of this sample without further air sweep to 16 hours heating at 175° C., left the PET somewhat darkened but completely flexible.

As can be seen by the EXAMPLES, use of phenolic novolac resins having free phenol substantially removed solves PET embrittlement under normal curing conditions, i.e. 175° C. for 4 hours. Low phenol resins of the type described above as Reichhold No. 24-706, have been used in 5KVA transformers of the construction shown in FIG. 1 with no PET embrittlement over long time periods after phenolic cure. Also, air purging solves PET embrittlement even in a high free phenol environment, i.e. about 3.7% of the weight of the PET.

I claim:

1. A method of curing phenolic resin near polyethyleneterephthalate, where the polyethyleneterephthalate has exposed areas subject to degradation by vaporous materials, comprises removing free phenol from the phenolic resin and heating the phenolic resin to a cured state.

2. The method of claim 1, where during heating, air is passed near the phenolic resin in a manner and amount effective to remove vapors caused by heating the phenolic resin.

3. A method of curing phenolic novolac resin contained in an electrical apparatus where polyethyleneterephthalate film is used in an insulating capacity in the apparatus, and has exposed areas subject to vapor absorption and degradation by vaporous materials, and where the phenolic novolac resin contains free phenol subject to being vaporized; comprising the steps of: (1) positioning said apparatus in an air permeable case having a known void volume, said apparatus containing polyethyleneterephthalate insulation with an exposed surface area subject to vapor absorption, (2) removing free phenol from the phenolic novolac resin, and (3) heating the apparatus containing the phenolic novolac resin at a temperature of between about 145° C. to about 180° C., for up to 8 hours, to cure the phenolic novolac resin without degrading the polyethyleneterephthalate.

4. The method of claim 3, where, during the heating step, air is passed through the apparatus in a manner and amount effective to remove vapors caused by heating the phenolic resin.

5. The method of claim 3, wherein the phenolic novolac resin is applied as a thin coating on filler particles which are contained in the void volume of the case and surround the electrical apparatus.

6. The method of claim 4, wherein the air is passed through the apparatus at least once at a rate of about 1 to about 3 times the void volume of the case over a time period of between about 15 seconds and about 7 minutes during the heating step, before diffusion of the vapors into the polyethyleneterephthalate.

7. The method of claim 4, wherein the total weight of free phenol in the phenolic novolac resin is from about 5% to about 10%.

8. The method of claim 5 wherein, after positioning the apparatus in the case: (1) the space between the case and the electrical apparatus is filled with a first particulate filler material to a level above the top of the electrical apparatus, (2) a second particulate filler material containing finely-divided particles, each coated with phenolic novolac resin is poured onto said first filler, and (3) the case is vibrated until the second resin coated filler is evenly dispersed through said first filler material.

9. The method of claim 5, where the apparatus is heated at between 155° C. to about 175° C., for between 4 hours to 6 hours.

10. The method of claim 5, wherein the electrical apparatus is a transformer containing assemblies having wound conducting layers, wherein the polyethyleneterephthalate is used as insulation between layers of the assembly.

* * * * *